United States Patent [19]

Ito

[11] Patent Number: 5,414,525
[45] Date of Patent: May 9, 1995

[54] IMAGE COMMUNICATING APPARATUS

[75] Inventor: Hiroyasu Ito, Yokohama, Japan

[73] Assignee: Canon Kabushiki Kaisha, Tokyo, Japan

[21] Appl. No.: 139,758

[22] Filed: Oct. 25, 1993

[30] Foreign Application Priority Data

Oct. 26, 1992 [JP] Japan .................. 4-311002

[51] Int. Cl.⁶ .................. H04N 1/41; H04N 1/415
[52] U.S. Cl. ..................... 358/426; 358/433
[58] Field of Search ............... 358/426, 432, 433, 429, 358/430, 261.1, 261.2, 261.3, 261.4, 427, 428, 420, 421; 382/56

[56] References Cited

U.S. PATENT DOCUMENTS 4,774,587 9/1988 Schmitt .................. 358/426
5,231,487 7/1993 Hurley .................. 358/133
5,283,646 2/1994 Bruder .................. 348/415

Primary Examiner—Stephen Brinich
Assistant Examiner—Jerome Grant, II
Attorney, Agent, or Firm—Fitzpatrick, Cella, Harper & Scinto

[57] ABSTRACT

An image communicating apparatus comprises:
an input device to input image data;
a dividing circuit to divide the input image data into a plurality of blocks each of which is constructed by a predetermined number of pixels, an encoder to encode the image data on a unit basis of the blocks divided by the dividing circuit;
and a transmission unit for allocating the data divided and encoded by the dividing circuit and the encoder to an arbitrary channel among a plurality of information channels on a block unit basis.

11 Claims, 10 Drawing Sheets

IMAGE COMMUNICATING APPARATUS

BACKGROUND OF THE INVENTION

1. Field of the Invention

The present invention relates to an image communicating apparatus for communicating image data through a fundamental interface of a digital communication network such as an ISDN or the like and, more particularly, to an image communicating apparatus for communicating image data by using a plurality of information channels.

2. Related Background Art

In an image communicating apparatus for communicating image data through an ISDN fundamental interface, for example, in the case where the image data is divided into a plurality of blocks and encoded and compressed and the compressed image data is communicated by using two B channels in order to raise the communication speed, since the ISDN fundamental interface doesn't support the bulk transmission using two B channels, the following method is considered. Namely, as shown in FIG. 10, data of a block 1 is first compressed, the compressed data of the block 1 is further divided into two blocks 1a and 1b, the compressed data divided into two blocks 1a and 1b is distributed to each of the two B channels ($B_1$ channel and $B_2$ channel) and communicated, and processings similar to those mentioned above are also repeated with respect to the blocks 2, 3, 4, ....

According to the above method, however, on the reception side, until both of the compressed data of the blocks 1a and 1b which were distributed to two B channels are obtained, they cannot be expanded. Therefore, in the case where there is a speed difference between two B channels, the case where there is a difference between the arrival times of the two compressed data divided from one block, the case where an error ratio of one B channel is high, or the like, there occurs a problem such that the compressed data cannot be expanded or confirmed at a high speed.

SUMMARY OF THE INVENTION

The invention intends to eliminate the drawbacks of the above conventional technique and it is an object of the invention to provide an image communicating apparatus in which an apparatus on the reception side can promptly expand and check compressed data on a block unit basis.

Another object of the invention is to provide an image communicating apparatus in which image data can be communicated at a high speed by using a plurality of channels and by allocating compressed data to one channel on a block unit basis in which the image data can be compressed or expanded, and data communication can be efficiently executed at a high speed.

Still another object of the invention is to provide an image communicating apparatus in which since image data is communicated on a block unit basis in which it can be compressed or expanded, a buffer to synthesize data which is sent from a plurality of information channels is unnecessary.

Further another object of the invention is to provide an image communicating apparatus in which data compressed by a JPEG method can be efficiently communicated at a high speed.

The above and other objects and features of the present invention will become apparent from the following detailed description and the appended claims with reference to the accompanying drawings.

DETAILED DESCRIPTION OF PREFERRED EMBODIMENTS

An embodiment of the invention will now be described with reference to the drawings.

Figure 1:
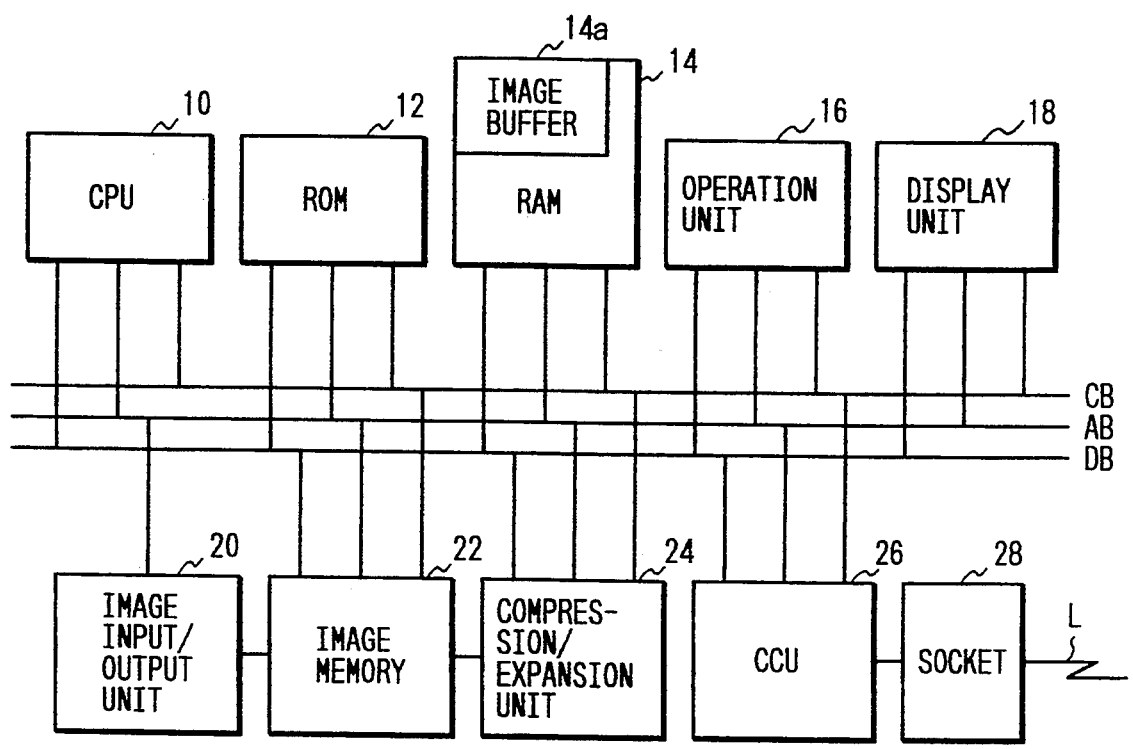
FIG. 1 is a block diagram showing a whole construction of an image communicating apparatus according to an embodiment of the invention.

FIG. 1 is a block diagram showing a schematic construction of an image communicating apparatus according to the first embodiment of the invention. The image communicating apparatus executes an image communication mainly by a CPU 10. An ROM 12, an RAM 14, an operation unit 16, a display unit 18, an image input-/output unit 20, an image memory 22, a compression-/expansion unit 24, and a CCU (Communication Control Unit) 26 are connected to the CPU 10 through a control bus CB, an address bus AB, and a data bus DB. The CCU 26 is connected to a digital line L such as an ISDN (Integrated Service Digital Network) or the like through a digital socket 28 for an ISDN fundamental interface.

The CPU 10 executes various kinds of arithmetic operations, logical judgments, and the like for image communication and controls each of the above component elements through the control bus CB, address bus AB, and data bus DB. In this instance, the CPU 10 transfers an address signal to indicate the component element as a target for control through the address bus AB and transfers a control signal and data to such a component element as a control target through the control bus CB and data bus DB, respectively.

Various kinds of programs have been preset in the ROM 12. The CPU 10 executes various kinds of controls in accordance with the programs stored in the ROM 12.

The RAM 14 is used to temporarily store various kinds of data from the component elements. The RAM 14 has therein an image buffer 14a to temporarily store the image data compressed by the compression/expansion unit 24 or the image data (compressed data) received through the CCU 26.

The operation unit 16 has various kinds of function keys such as dial key, transmission key, reception key, and the like for instructing various kinds of functions to the image communicating apparatus.

The display unit 18 has an LED, an LCD, or the like and displays various kinds of states of the image communicating apparatus.

The image input/output unit 20 has: an image input unit such as image scanner, video input, or the like; and an image output unit such as printer, video output, CRT display, or the like.

The image memory 22 stores the image data supplied from the image input/output unit 20 and the image data to be generated to the image input/output unit 20.

Programs for compressing or expanding the image data and fixed data have been stored in the compression/expansion unit 24. The compression/expansion unit 24 compresses the image data as a target for transmission which was stored in the image memory 22 and stores the compressed image data into the image buffer 14a. Or, the compression/expansion unit 24 expands the compressed data according to the reception which was stored in the image buffer 14a and stores the expanded image data into the image memory 22. The compression processing of the image data by the compression/expansion unit 24 is executed by an encoding processing on the basis of, for example, an MR method (Modified Read method, two-dimensional coding method), a coding method using an orthogonal transformation by a JPEG (Joint Photographic Expert Group), or the like. The expansion processing of the image data is performed by decoding the coded data.

The CCU 26 executes various kinds of controls for communicating the compressed image data through the digital socket 28 for ISDN fundamental interface and the line L.

When the image data stored in the image memory 22 is transmitted, the CPU 10 controls in a manner such that the image data is sequentially extracted from the image memory 22 on a predetermined block unit basis and supplied to the compression/expansion unit 24 and the image data compressed by the compression/expansion unit 24 on the above block unit basis is transmitted by alternately using two B channels of the ISDN fundamental interface.

In this case, although the above block unit is set to a block unit such that the compressed image data can be expanded by such sole block, such a block unit which can solely expand the image data differs in dependence on a coding (compressing) method.

For example, according to the above MR method, generally, the first line is one-dimensionally encoded (compressed), the next second to fourth lines are encoded with reference to the data of the first line, the fifth line is one-dimensionally encoded (compressed), and the next sixth to eighth lines are encoded with reference to the data of the fifth line, and the above processings are repeated. That is, the image data is encoded while setting four lines into one block. According to the MR method, therefore, the unit of one block is generally set to the data of four lines. Even in case of the MR method, however, for example, in the case where the first line is one-dimensionally encoded (compressed) and only the second line is encoded with reference to the data of the first line, the third line is subsequently one-dimensionally encoded (compressed) and the next fourth line is encoded with reference to the data of the third line, the unit of one block is obviously set to the data of two lines.

According to the coding method using the orthogonal transformation by the JPEG, since the encoding is executed on a unit basis of 8 (main scan pixels)×8 (sub scan pixels) blocks which are used as a unit, the unit of one block is set to the data of eight lines.

The coding method by the JPEG is an effective coding method in case of compressing multivalue image data.

The transmission processing will now be described with reference to a flowchart of FIG. 2.

First, a call with the channel $B_1$ is set (step S1). A call with the channel $B_2$ is set (step S2). A check is made to see if the image data of the final block is being transmitted or not (step S3). If NO, a check is further made to see if the image data is being transmitted through the $B_1$ channel or not (step S4). If NO in step S4, the next block (the first block at the start of the processing) is extracted from the image data stored in the image memory 22 and is compressed by encoding the image data by the compression/expansion unit 24, and the compressed data of one block is stored into the image buffer 14a (step S5). The compressed data of one block stored in the image buffer 14a is transmitted to the B channel through the CCU 26 (step S6). In this case, the transmission control by the CCU 26 and the processings according to the flowchart are executed in parallel.

A check is made to see if the image data of the final block is being transmitted or not (step S7). If NO, a check is further made to see if the image data is being transmitted through the $B_2$ channel or not (step S8). If NO in step S8, the next block is extracted from the image data stored in the image memory 22 and compressed by encoding the image data by the compression-/expansion unit 24 and the compressed data is stored into the image buffer 14a (step S9). The compressed data of one block stored in the image buffer 14a is transmitted to the $B_2$ channel through the CCU 26 (step S10). The processing routine is returned to step S3. In this case as well, the transmission control by the CCU 26 and the processing according to the flowchart are executed in parallel.

When it is determined in step S4 that the image data is being transmitted through the $B_1$ channel, step S7 follows. When it is decided in step S8 that the image data is being transmitted through the $B_2$ channel, the processing routine is returned to step S3. When it is judged in steps S3 and S7 that the image data of the final block is being transmitted, step S11 follows.

In step S11, the apparatus waits for the end of transmission of the image data of the final block. The call of the $B_1$ channel is released (step S12). The call of the $B_2$ channel is released (step S13). The processing routine is finished.

Figure 3:
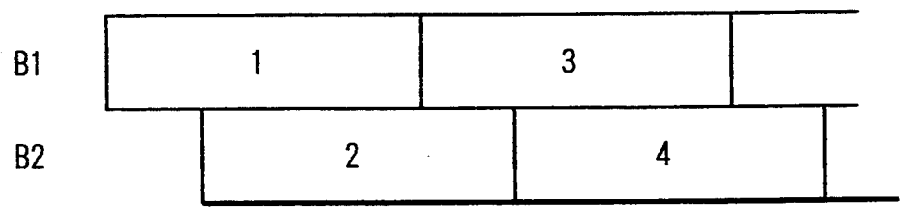
FIG. 3 is a conceptual diagram showing states of compression and transmission of image data.

By the above transmission processing, as shown in FIG. 3, the image data of the block 1 is first compressed and is transmitted by the $B_1$ channel, the image data of the block 2 is subsequently compressed and is transmitted by the $B_2$ channel, and after completion of the transmission by the $B_1$ channel, the compressed data of the block 3 is transmitted by the $B_1$ channel. In this manner, the compressed data is transmitted on a block unit basis in which the image data can be solely expanded by alternately using the $B_1$ and $B_2$ channels.

A reception processing of image data will now be described with reference to a flowchart of FIG. 4.

The call with the channel $B_1$ is first set (step S41) and the call with the channel $B_2$ is subsequently set (step S42). A check is made to see if the image (compressed)

data of the final block is being received or not (step S43). If NO, a check is further made to see if the compressed data of one 10 block has been received through the $B_1$ channel or not (step S44). If YES, the compressed data of one block stored in the image buffer 14a is expanded by the compression/expansion unit 21 and stored in the image memory 22 (step S45). The expanded image data in the image memory 22 is supplied to the image input/output unit 20 (step S46).

A check is subsequently made to see if the compressed data of the final block is being received or not (step S47). If NO, a check is further made to see if the compressed data of one block has been received through the $B_2$ channel or not (step S48). If YES, the compressed data of one block stored in the image buffer 14a is expanded by the compression/expansion unit 21 and stored into the image memory 22 (step S49). The expanded image data in the image memory 22 is supplied to the image input/output unit 20 (step S50).

When it is judged in step S44 that the image data of one block is not yet perfectly received through the $B_1$ channel, step S47 follows. In step S48, when it is determined that the image data of one block is not yet completely received through the $B_2$ channel, the processing routine is returned to step S43. When it is decided in steps S43 and S47 that the image data of the final block is being received, step S51 follows.

In step S51, the apparatus waits for the end of reception of the compressed data of the final block. the compressed data of the final block stored in the image buffer 14a is expanded by the compression/expansion unit 21 and stored into the image memory 22 (step S52). The expanded image data of the final block in the image memory 22 is supplied to the image input/output unit 20 (step S53). The call of the $B_1$ channel is released (step S54) and the call of the $B_2$ channel is released (step S55). The processing routine is finished.

As mentioned above, the compressed data is divided into the blocks in which the image data can be solely expanded and is transmitted by alternately using the $B_1$ and $B_2$ channels. Therefore, on the reception side, as shown in the flowchart of FIG. 4, the received compressed data can be immediately expanded through the $B_1$ or $B_2$ channel. That is, there is no need to wait for the expanding process until both of the compressed data of two blocks transmitted through the $B_1$ and $B_2$ channels are received as in the conventional apparatus.

An example of compressing the data by the JPEG will now be described further in detail.

Figure 5:
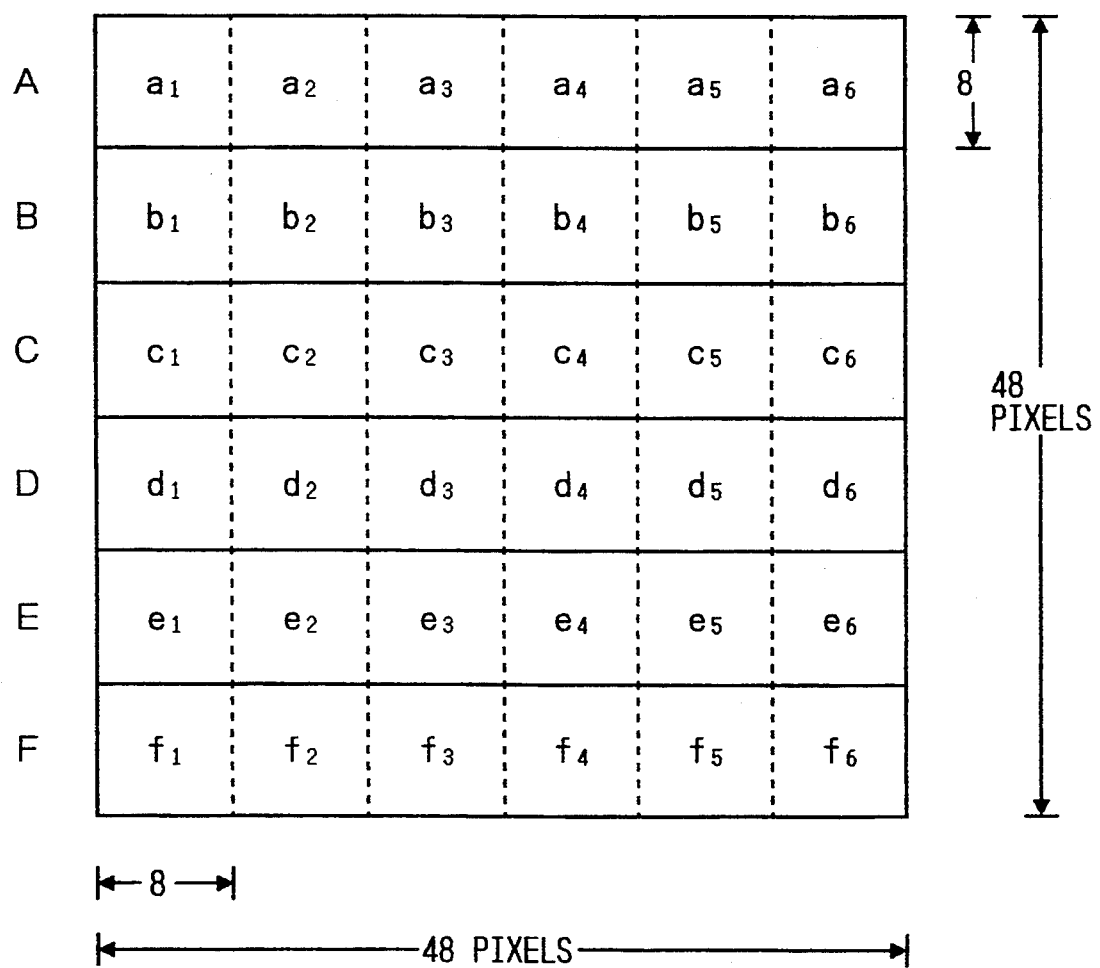
FIG. 5 is a diagram for explaining compression according to a JPEG method.

As shown in FIG. 5, when considering the case where the image data comprising 48×48 pixels is JPEG encoded and communicated, since the image data is encoded on a block unit basis of 8×8 pixels according to the JPEG, the whole image data is divided into 36 blocks. Those blocks are referred to as ($a_0$ to $a_6$), ($b_0$ to $b_6$), ..., and ($f_0$ to $f_6$) and that the ($a_0$ to $a_6$) blocks are referred to as a block A in a lump, the ($b_0$ to $b_6$) blocks are referred to a block B in a lump, ..., and the ($f_0$ to $f_6$) blocks are referred to as a block F in a lump.

According to the JPEG encoding method, each of the blocks A to F can be solely compressed or expanded. That is, to compress or expand the image data of the block A, it is sufficient that only the image data or compressed data of the block A exists, and the image data or compressed data of the blocks B, C, ..., F are unnecessary.

Similarly, to compress or expand the image data of the block B, it is sufficient that only the image data or compressed data of the block B exists. The same also shall apply to the blocks C to F. In the JPEG method, the image data can solely be compressed or expanded by only the block $a_1$. However, by combining the ($a_1$ to $a_6$) blocks existing in eight lines to the block A, the control for display or generation is simplified. For this purpose, in the embodiment, the ($a_0$ to $a_6$) blocks are regarded as one block in a lump.

Figure 2:
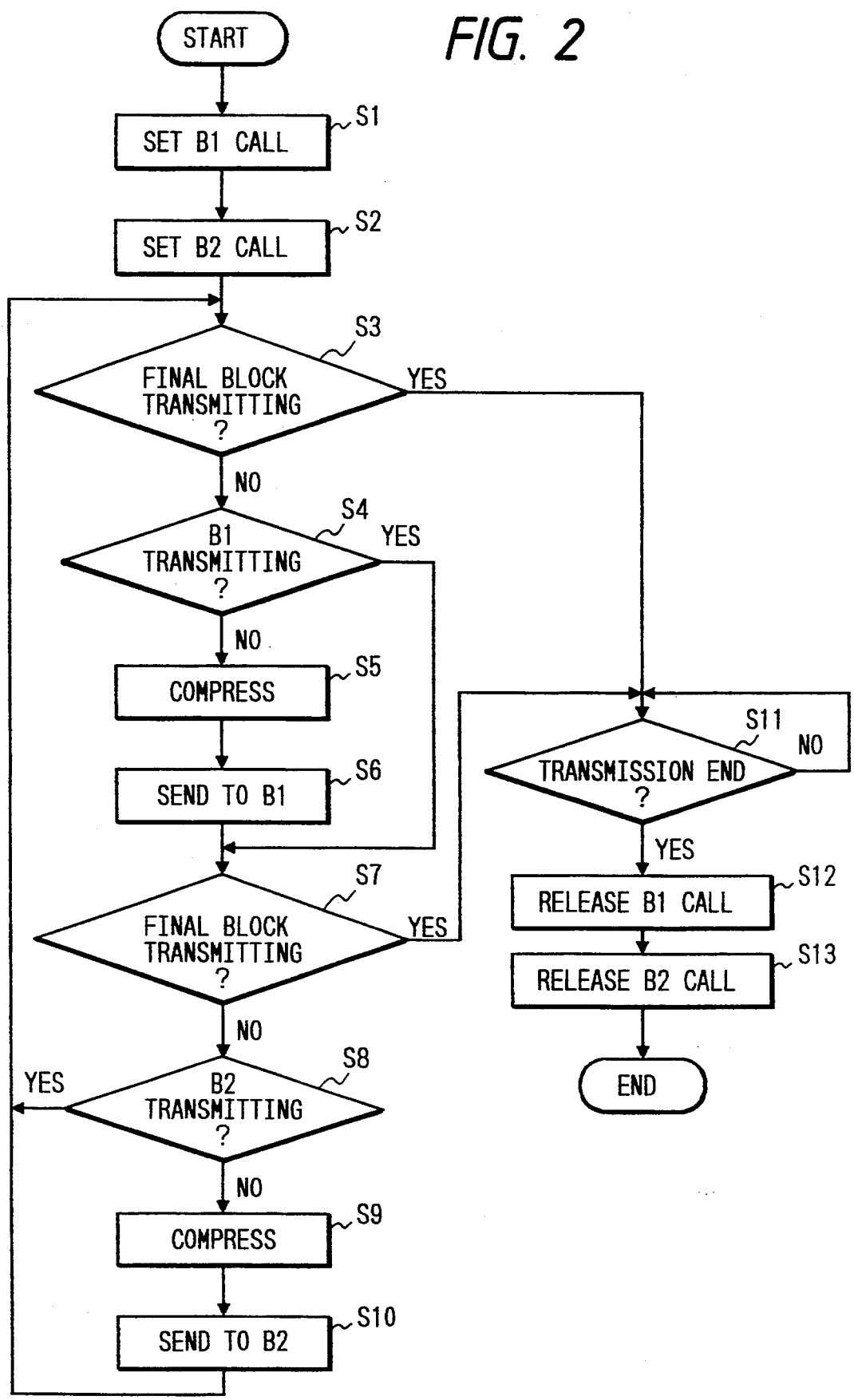
FIG. 2 is a flowchart showing a transmission processing of image data.
Figure 4:
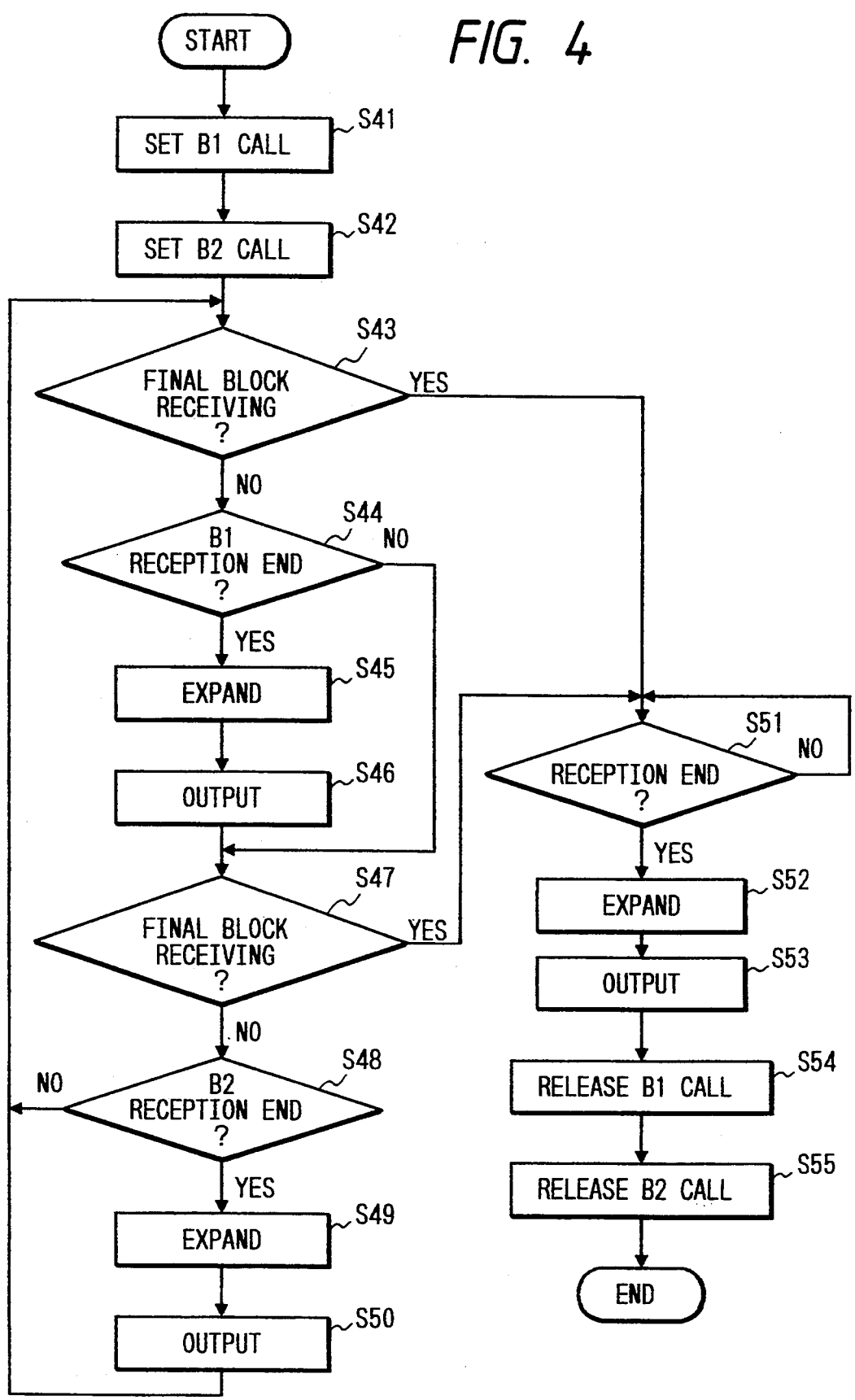
FIG. 4 is a flowchart showing a reception processing of image data.
Figure 6:
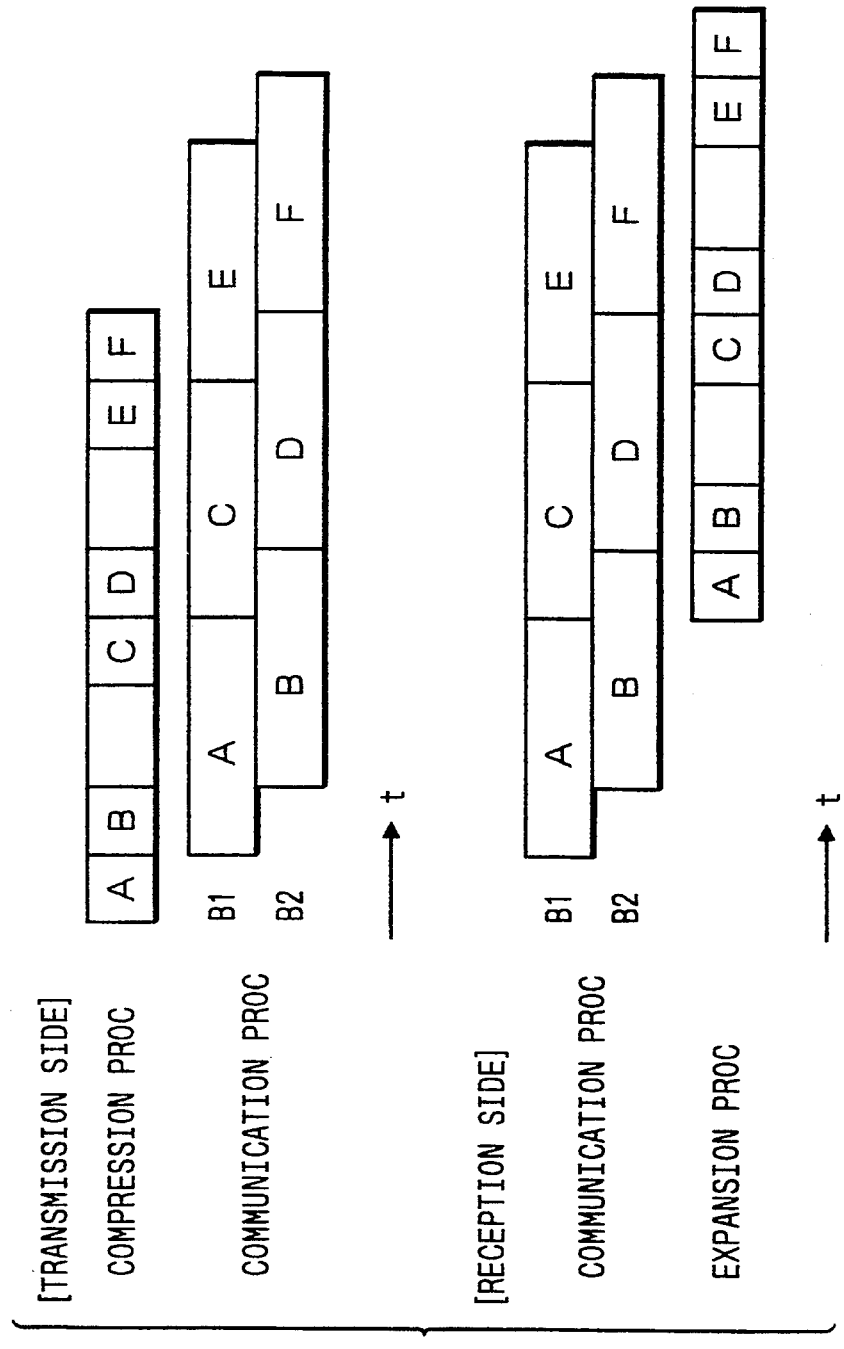
FIGS. 6 and 7 are diagrams showing examples of the transmission and reception of compressed data.

Flowcharts for transmission and reception in such a case are similar to those shown in FIGS. 2 and 4. When the image data is communicated by the transmission and reception processings shown in FIGS. 2 and 4, as shown in FIG. 6, on the transmission side, the image data of the block A is first compressed and is transmitted by the $B_1$ channel. Subsequently, the image data of the block B is compressed and is transmitted by the $B_2$ channel. After completion of the transmission by the $B_1$ channel, the compressed data of the Block C is transmitted by the $B_1$ channel. In this manner, the compressed data is transmitted on a block unit basis in which the image data can solely be expanded by alternately using the $B_1$ and $B_2$ channels. On the reception side, the compressed data of the block A is first received by the $B_1$ channel. The compressed data of the block B is subsequently received by the $B_2$ channel. After completion of the reception by the $B_1$ channel, the compressed data of the block A is expanded. The compressed data of the block C is further received by the $B_2$ channel. In this manner, the compressed data is received on a block unit basis in which the image data can solely be expanded by alternately using the $B_1$ and $B_2$ channels.

Figure 7:
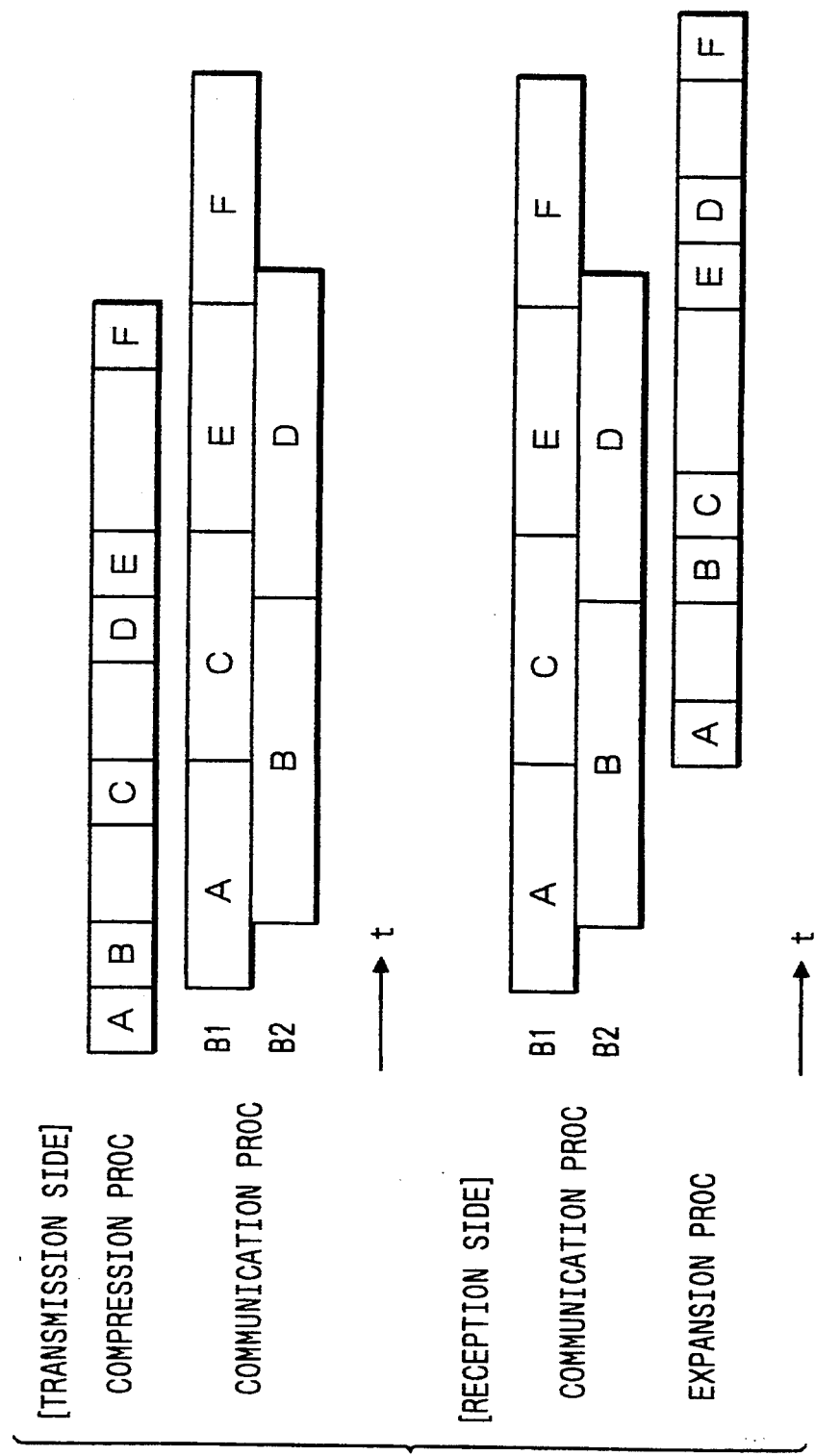

Now, consideration is made to the case where during the above communication processing, the compressed data size of each of the blocks B and D is larger than the compressed data size of each of the blocks A, C, E, and F. In this case, as shown in FIG. 7, on the transmission side, the image data of the block A is first compressed and is transmitted by the $B_1$ channel The image data of the block B is subsequently compressed and is transmitted by the $B_2$ channel. After completion of the transmission by the $B_1$ channel, the compressed data of the block C is transmitted by the $B_1$ channel. After completion of the transmission by the $B_2$ channel, the compressed data of the block D is transmitted by the $B_2$ channel. After completion of the transmission by the $B_1$ channel, the compressed data of the block E is transmitted by the $B_1$ channel. Since the transmission by the $B_1$ channel was finished earlier than the $B_2$ channel, the data of the block F is transmitted by the $B_1$ channel. In this manner, the compressed data is transmitted on a block unit basis in which the image data can solely be expanded by using the $B_1$ and $B_2$ channels. On the reception side, the compressed data of the block A is first received by the $B_1$ channel. The compressed data of the block B is subsequently received by the $B_2$ channel. After completion of the reception by the $B_1$ channel, the compressed data of the block A is expanded. Further, the compressed data of the block C is received by the $B_1$ channel. After completion of the reception by the $B_2$ channel, the compressed data of the block B is expanded. The compressed data of the block D is received by the $B_2$ channel. After completion of the reception by the $B_1$ channel, the compressed data of the block C is expanded. Further, the compressed data of the block E is received by the $B_1$ channel. After completion of the reception by the $B_1$ channel, the compressed data of the block E is expanded. The compressed data of the block F is further received by the $B_1$ channel. After completion of the reception by the $B_2$ channel, the compressed data of the block D is expanded. After completion of the reception by the $B_1$ channel, the compressed data of the block F is expanded. In this manner, the compressed data is received on a block unit basis in which the image data can solely be expanded by using the $B_1$ and $B_2$ channels.

Figure 8:
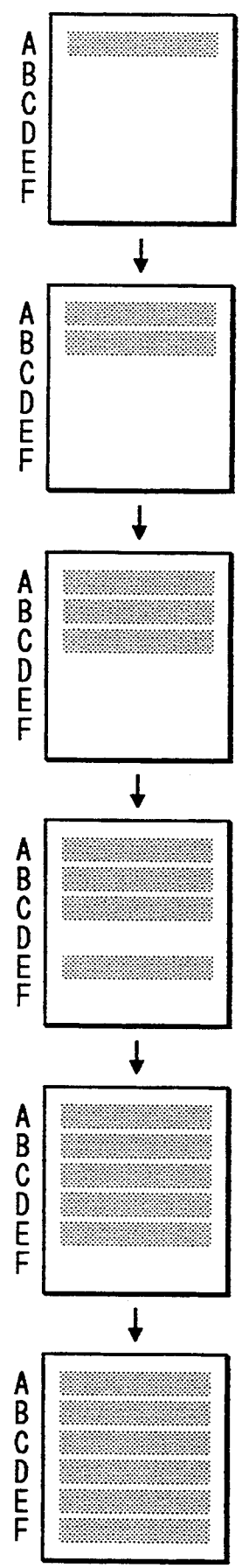
FIG. 8 is a diagram showing a display example based on reception data.

In this instance, FIG. 8 shows states of images of the blocks after completion of the reception and expansion on the reception side.

On the other hand, as mentioned above, not only in the case where the size of compressed data largely differs in dependence on the block but also when an error occurs in one information channel, many blocks can be allocated to the other information channels having no error and the image data can be communicated.

In the embodiment, since the reception control apparatus receives on a block unit basis in which the image data can be compressed or expanded, the buffer to absorb the difference of the delay times between two information channels is unnecessary. That is, the data can be immediately displayed and outputted by the block unit received by one information channel.

Figure 9:
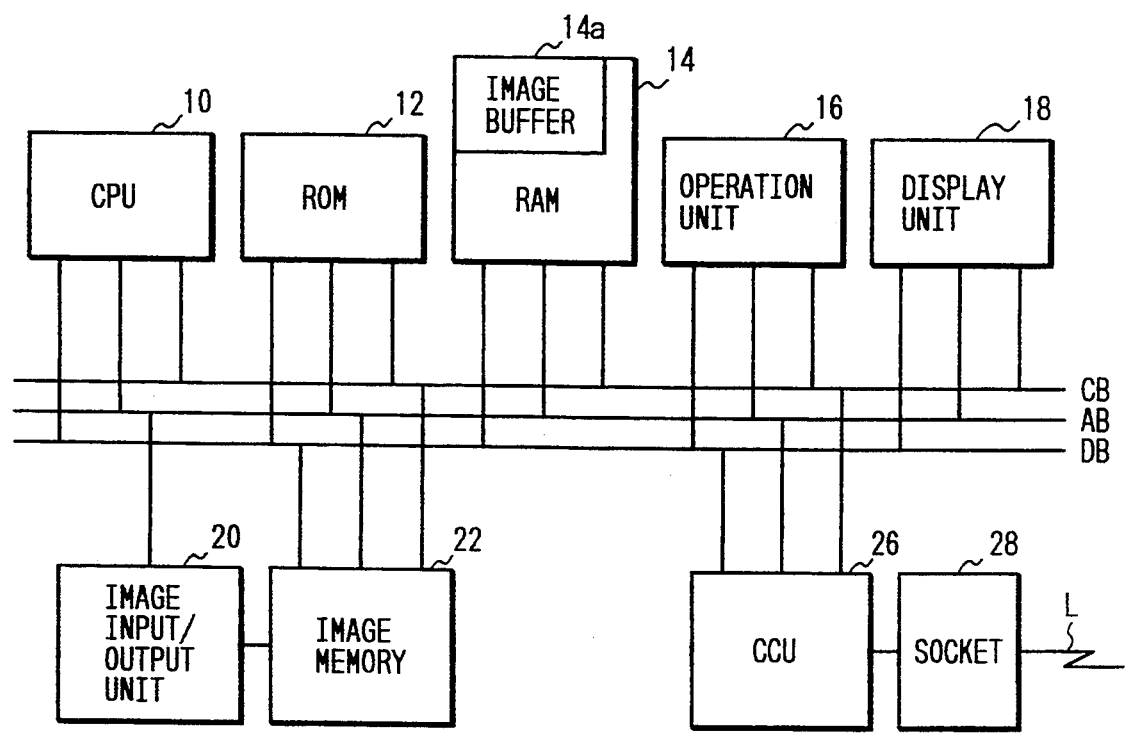
FIG. 9 is a block diagram showing a whole construction of an image communicating apparatus according to another embodiment of the invention.
Figure 10:
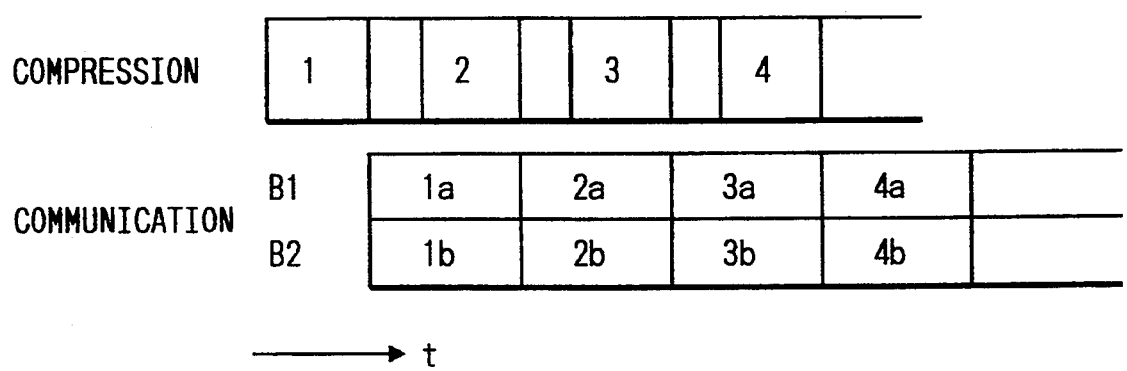
FIG. 10 is a conceptual diagram showing states of the compression and transmission of image data according to a conventional image communicating apparatus.

FIG. 9 is a block diagram of a schematic construction of an image communicating apparatus in which a part of the construction of FIG. 1 is modified.

The embodiment shown in FIG. 9 differs from the embodiment of FIG. 1 with respect to only a point of component elements such that the compression/expansion unit 24 is not used.

The compression and expansion processings of the image data which are executed by the compression/expansion unit 24 are executed by the CPU 10. For this purpose, programs to compress or expand the image data and the fixed data have been preset in the ROM 12.

As mentioned above, since the embodiment shown in FIG. 9 differs from the embodiment shown in FIG. 1 with respect to only a point that the compression and expansion processings are executed by the direct control by the CPU 10, it is sufficient to perform the transmission and expansion processings in accordance with the flowcharts of FIGS. 2 and 4. For example, in the transmission processing, in steps S5 and S9 in FIG. 2, the next block is extracted from the image data stored in the image memory 22 and compressed by the control of the CPU 10 and the compressed image data is stored into the image buffer 14a. In the reception processing, in steps S45 and S49 in FIG. 4, the image data which had been received through the $B_1$ and $B_2$ channels and were stored into the image buffer 14a through the CCU 26 is expanded by the control of the CPU 10 and the expanded data is stored into the image memory 22.

The invention is not limited to the above embodiment but, for example, it is also possible to construct in the following manner. Namely, after the image data stored in the image memory 22 was divided into the blocks, the whole image data stored in the image memory 22 is compressed and stored into the image buffer 14a without compressing the image data every block and storing into the compressed data into the image buffer 14a, and the compressed data stored in the image buffer 14a is divided into blocks in which the image data can solely be expanded and is transmitted. On the other hand, in case of transmitting the compressed and divided data through the $B_1$ and $B_2$ channels, when an amount of compressed data per block is small, the $B_1$ and $B_2$ channels are not alternately used but, for example, those channels can be also used such as $B_1$ channel, $B_1$ channel, $B_2$ channel, $B_2$ channel, $B_1$ channel, $B_1$ channel, . . . . Further, the compressed and divided data can be also arbitrarily distributed to two $B_1$ and $B_2$ channels and is transmitted by a method other than the above example.

The information channels which are used are not limited to the two $B_1$ and $B_2$ channels but the block data can be also allocated to three or more channels.

As described above, according to the image communicating apparatus of the embodiment, in order to increase the communicating speed, in the case where the image data is divided into a plurality of blocks and is compressed and the compressed data is communicated through at least two information channels of the fundamental interface of the digital communication network, the data which was divided into blocks in which the data can solely be expanded and was compressed is transmitted on such a block unit basis by using at least two information channels of the fundamental interface of the digital communication network. Therefore, on the reception side, after the compressed data of one block was received, it can immediately be expanded and checked. That is, even in the case where there is a speed difference between at least two information channels, the case where an error ratio of one information channel is high, or the like, the data of the received block unit can be promptly expanded and checked.

Although the preferred embodiments of the invention have been described above, the invention is not limited to the foregoing embodiments but many modifications and variations are possible within the spirit and scope of the appended claims of the invention.

What is claimed is:

1. An image communicating apparatus comprising:
   input means for inputting image data;
   dividing means for dividing said input image data into a plurality of blocks each of which is constructed by a predetermined number of pixels;
   encoding means for encoding the image data on a unit basis of said blocks divided by said dividing means; and
   transmitting means for allocating the data which was divided and encoded by said dividing means and said encoding means to arbitrary channels among a plurality of information channels on a block unit basis and for transmitting,
   wherein said transmitting means uses at least two information channels, first and second information channels, for transmitting encoded block data, and
   wherein said transmitting means transmits encoded second block data by using the second information channel, while transmitting encoded first block data by using the first information channel.

2. An apparatus according to claim 1, wherein said dividing means divides the image data into a plurality of blocks each of which is constructed by pixels of a plurality of lines.

3. An apparatus according to claim 2, wherein said encoding means encodes the image data by a 2-dimensional compressing method.

4. An apparatus according to claim 2, wherein said encoding means encodes the image data by a JPEG method.

5. An apparatus according to claim 1, wherein said transmitting means transmits the data encoded by using two $B_1$ and $B_2$ information channels of a digital communication network.

6. An apparatus according to claim 5, wherein said transmitting means allocates the data encoded on said block unit basis to the idle channel in said $B_1$ and $B_2$ information channels.

7. An image communicating apparatus comprising:

receiving means for receiving data encoded on a block unit basis from each of a plurality of information channels;

expanding means for sequentially expanding the data which was received and encoded on said block unit basis on a block unit basis; and output means for sequentially outputting the image data expanded by said expanding means, wherein said receiving means uses at least two information channels, first and second information channels, for receiving encoded block data, and wherein said receiving means receives encoded second block data by using the second information channel, while receiving encoded first block data by using the first information channel.

8. An apparatus according to claim 7, wherein said receiving means receives the image data encoded by a JPEG method.

9. An apparatus according to claim 7, wherein said receiving means receives the encoded data through $B_1$ and $B_2$ channels of a digital communication network.

10. An image communicating method comprising the steps of:

an inputting step for inputting image data;

a dividing step for dividing the input image data into a plurality of blocks each of which is constructed by a predetermined number of pixels;

an encoding step for encoding the image data on a unit basis of the blocks divided by the dividing step; and a transmitting step for allocating the data which was divided and encoded by the dividing step and the encoding step to arbitrary channels among a plurality of information channels on a block unit basis and for transmitting, wherein the transmitting step uses at least two information channels, first and second information channels, for transmitting encoded block data, and wherein the transmitting step transmits encoded second block data by using the second information channel, while transmitting encoded first block data by using the first information channel.

11. An image communicating method comprising the steps of:

a receiving step for receiving data encoded on a block unit basis from each of a plurality of information channels;

an expanding step for sequentially expanding the data which was received and encoded on the block unit basis on a block unit basis; and an output step for sequentially outputting the image data expanded by the expanding means, wherein the receiving step uses at least two information channels, first and second information channels, for receiving encoded block data, and wherein the receiving step receives encoded second block data by using the second information channel, while receiving encoded first block data by using the first information channel.

* * * * *

UNITED STATES PATENT AND TRADEMARK OFFICE
CERTIFICATE OF CORRECTION

PATENT NO. : 5,414,525
DATED : May 9, 1995
INVENTOR(S) : HIROYASU ITO

It is certified that error appears in the above-identified patent and that said Letters Patent is hereby corrected as shown below:

COLUMN 1

Line 21, "doesn't" should read --does not--.

COLUMN 2

Line 27, "PREFERRED" should read --THE PREFERRED--.

COLUMN 4

Line 23, "B channel" should read --$B_1$ channel--.
　　Line 56, "$B_1$channel" should read --$B_1$ channel--.

COLUMN 5

Line 3, "10" should be deleted.
　　Line 29, "block. the" should read --block. The--.

COLUMN 6

Line 18, "Block C" should read --block C--.

UNITED STATES PATENT AND TRADEMARK OFFICE
CERTIFICATE OF CORRECTION

PATENT NO. : 5,414,525
DATED : May 9, 1995
INVENTOR(S) : HIROYASU ITO

It is certified that error appears in the above-identified patent and that said Letters Patent is hereby corrected as shown below:

COLUMN 8

Line 57, "2-dimen-" should read --two-dimen- --.

Signed and Sealed this

Twenty-second Day of August, 1995

Attest:

BRUCE LEHMAN

Attesting Officer     Commissioner of Patents and Trademarks